United States Patent [19]
Young

[11] Patent Number: 6,078,262
[45] Date of Patent: Jun. 20, 2000

[54] COLD TEMPERATURE ALARM SYSTEM

[76] Inventor: Joan Young, 3 Orchard Filed Terr., Kirknewton, Midlothian EM27 8BG, United Kingdom

[21] Appl. No.: 09/174,359

[22] Filed: Oct. 15, 1998

[51] Int. Cl.[7] .................................................. G08B 17/00
[52] U.S. Cl. ........................................... 340/584; 340/586
[58] Field of Search ..................................... 340/584, 586, 340/588, 589, 691.1, 691.3, 691.4, 691.6, 692, 593, 594

[56] References Cited

U.S. PATENT DOCUMENTS

| | | | |
|---|---|---|---|
| D. 275,842 | 10/1984 | Gilbert et al. | D10/104 |
| 3,753,259 | 8/1973 | Donovan | 340/584 |
| 3,959,787 | 5/1976 | Messmann et al. | 340/584 |
| 4,212,007 | 7/1980 | Reyes et al. | 340/691 |
| 4,316,179 | 2/1982 | Bliss et al. | 340/538 |
| 4,385,289 | 5/1983 | McMillan | 340/585 |
| 4,800,371 | 1/1989 | Arsi | 340/593 |
| 4,801,922 | 1/1989 | Worrell et al. | 340/586 |
| 4,994,792 | 2/1991 | Ziegler, Jr. | 340/584 |
| 5,041,816 | 8/1991 | Morrissey | 340/585 |

*Primary Examiner*—Nina Tong

[57] ABSTRACT

A cold temperature alarm system comprising a cabinet having a rectangular lower floor with four rubber foot pads adjacent to the corners for support purposes and parallel front and rear faces and parallel side faces and a top. The floor of the system has at least one aperture with an associated screw therethrough for coupling the floor to the remainder of the cabinet to selectively attain access to the interior of the cabinet. Also provided is a plurality of lights with distinctively different colors and with associated indicia on the front face of the cabinet to indicate "warm" temperature, "low" temperature and "freezing" temperature. A battery and associated electrical components couple the temperature sensor and lights to indicate the temperature sensed by the temperature sensor. Lastly provided is a cover plate that is located in the rear face of the cabinet to selectively allow access to the interior of the cabinet by a user.

12 Claims, 2 Drawing Sheets

COLD TEMPERATURE ALARM SYSTEM

BACKGROUND OF THE INVENTION

1. Field of the Invention

The present invention relates to a cold temperature alarm system and more particularly pertains to informing and alarming occupants of a room, audibly and visually, of the temperature condition.

2. Description of the Prior Art

The use of temperature sensors and alarms of known designs and configurations is known in the prior art. More specifically, temperature sensors and alarms of known designs and configurations heretofore devised and utilized for the purpose of alerting people of dangerous conditions through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,801,922 to Worrell et al. discloses a Low Temperature Alarm. U.S. Pat. No. 4,800,371 to Arsi discloses a Freeze Alarm. U.S. Pat. No. Des. 275,842 to Gilbert et al. discloses a Temperature Level Alarm. U.S. Pat. No. 4,316,179 to Bliss et al. discloses a Fire Detection System. U.S. Pat. No. 4,212,007 to Reyes et al. discloses a Combined Burglar Frightening Device and Alarm. Lastly, U.S. Pat. No. 5,041,816 to Morrissey discloses a Freezer Alarm System With Two Sensor Models. Each of the foregoing references are incorporated herein by reference.

In this respect, the cold temperature alarm system according to the present invention substantially departs from the conventional concepts and designs of the prior art, and in doing so provides an apparatus primarily developed for the purpose of informing and alarming occupants of a room, audibly and visually, of the temperature condition.

Therefore, it can be appreciated that there exists a continuing need for a new and improved cold temperature alarm system which can be used for informing and alarming occupants of a room, audibly and visually, of the temperature condition. In this regard, the present invention substantially fulfills this need.

SUMMARY OF THE INVENTION

In view of the foregoing disadvantages inherent in the known types of temperature sensors and alarms of known designs and configurations now present in the prior art, the present invention provides an improved cold temperature alarm system. As such, the general purpose of the present invention, which will be described subsequently in greater detail, is to provide a new and improved cold temperature alarm system and method which has all the advantages of the prior art and none of the disadvantages.

To attain this, the present invention essentially comprises a new and improved cold temperature alarm system for informing and alarming occupants of a room, audibly and visually, of the temperature condition comprising, in combination a cabinet which has a rectangular lower floor with four rubber foot pads adjacent to the corners for support purposes and parallel front and rear faces and parallel side faces a generally cylindrical top. The floor has at least one aperture with an associated screw therethrough for coupling the floor to the remainder of the cabinet to selectively attain access to the interior of the cabinet. Also provided is a screen formed in the front face of the cabinet with a temperature sensor thereadjacent within the cabinet for sensing the temperature within the room where the cabinet is located. Additionally provided are three lights with distinctively different colors and with associated indicia on the front face of the cabinet to indicate "warm" temperature, "low" temperature and "freezing" temperature. A battery is provided with associated electrical components for coupling the temperature sensor and lights to indicate the temperature sensed by the temperature sensor. Also provided is a cover plate located in the rear face of the cabinet to selectively allow access to the interior of the cabinet by a user. A speaker is provided within the cabinet and mounted with respect to the front face and coupled by the electrical components to the sensor and lights for providing an audible alarm when the freezing light is activated and illuminated. Lastly provided are two key hole shaped slots in the rear face of the cabinet for allowing the cabinet to be mounted to the wall of the room to be sensed.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cold temperature alarm system which has all of the advantages of the prior art temperature sensors and alarms of known designs and configurations and none of the disadvantages.

It is another object of the present invention to provide a new and improved cold temperature alarm system which may be easily and efficiently manufactured and marketed.

It is further object of the present invention to provide a new and improved cold temperature alarm system which is of durable and reliable constructions.

An even further object of the present invention is to provide a new and improved cold temperature alarm system which is susceptible of a low cost of manufacture with regard to both materials and labor, and which accordingly is then susceptible of low prices of sale to the consuming public, thereby making such cold temperature alarm system economically available to the buying public.

Even still another object of the present invention is to provide a cold temperature alarm system for informing and alarming occupants of a room, audibly and visually, of the temperature condition.

Lastly, it is an object of the present invention to provide a new and improved cold temperature alarm system comprising a cabinet having a rectangular lower floor with four rubber foot pads adjacent to the corners for support purposes and parallel front and rear faces and parallel side faces and a top. The floor of the system has at least one aperture with an associated screw therethrough for coupling the floor to the remainder of the cabinet to selectively attain access to the interior of the cabinet. Also provided is a plurality of lights with distinctively different colors and with associated indicia on the front face of the cabinet to indicate "warm" temperature, "low" temperature and "freezing" temperature. A battery and associated electrical components couple the temperature sensor and lights to indicate the temperature sensed by the temperature sensor. Lastly provided is a cover plate that is located in the rear face of the cabinet to selectively allow access to the interior of the cabinet by a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
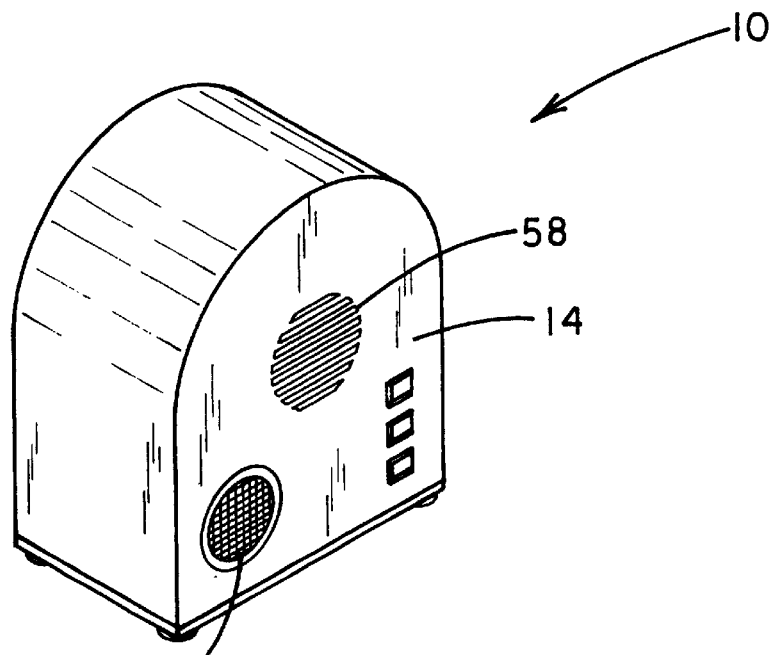
FIG. 1 is a perspective view of the preferred embodiment of the cold temperature alarm system constructed in accordance with the principles of the present invention.
Figure 2:
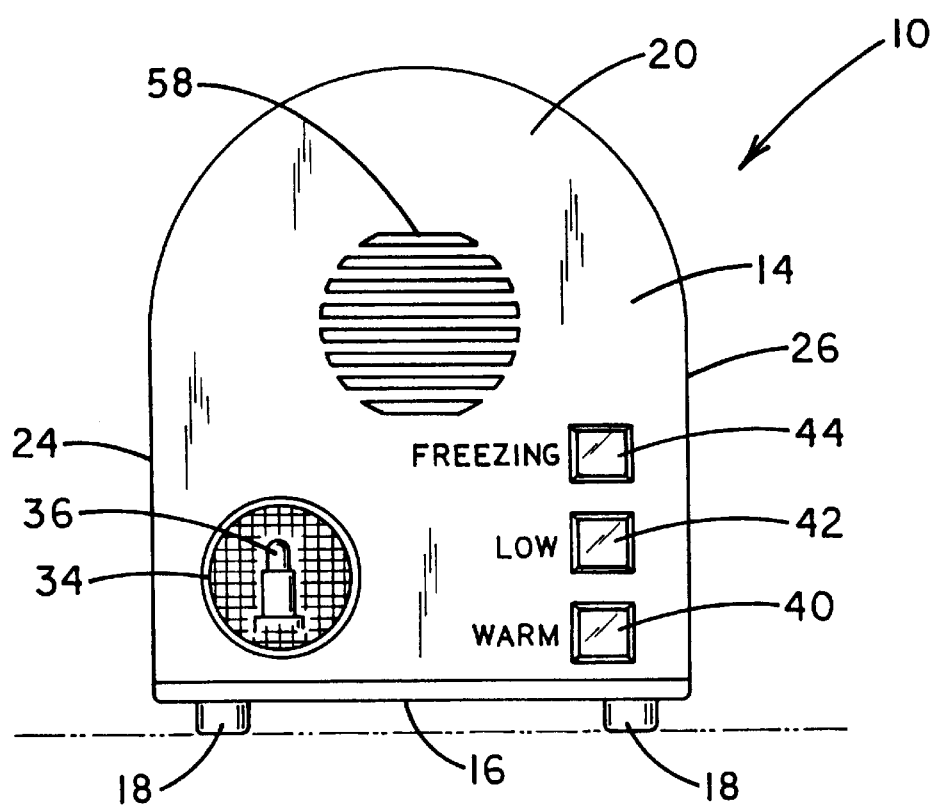
FIG. 2 is a front elevational view of the system shown in FIG. 1.
Figure 3:
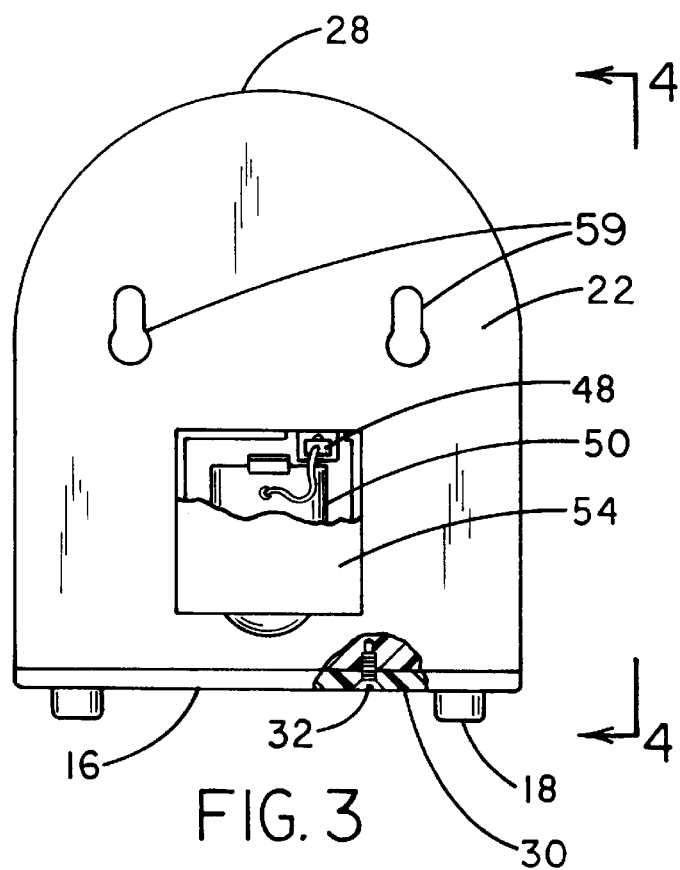
FIG. 3 is a rear elevational view of the system shown in the prior Figures with parts broken away to show certain internal constructions.
Figure 4:
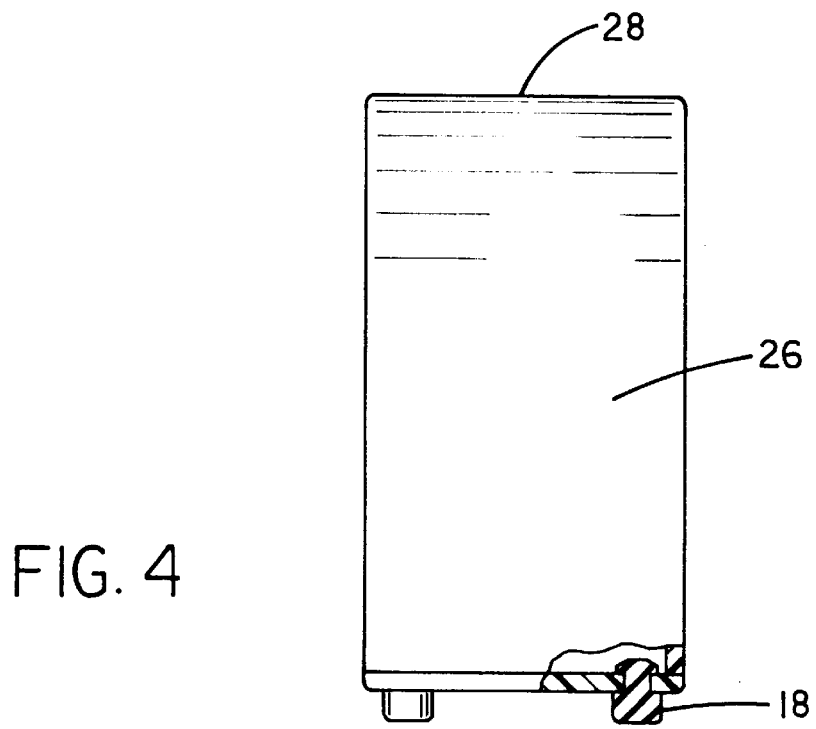
FIG. 4 is a side elevational view taken along line 4—4 of FIG. 3 with parts broken away to show certain internal constructions thereof.

With reference now to the drawings, and in particular to FIG. 1 thereof, the preferred embodiment of the new and improved cold temperature alarm system embodying the principles and concepts of the present invention and generally designated by the reference numeral 10 will be described.

The present invention, the cold temperature alarm system 10 is comprised of a plurality of components. Such components are individually configured and correlated with respect to each other so as to attain the desired objective.

More specifically, the new and improved cold temperature alarm system for informing and alarming occupants of a room, audibly and visually, of the temperature condition comprises, in combination a cabinet 14 which has a rectangular lower floor 16. The lower floor is equipped with four rubber foot pads 18 adjacent to the corners for support purposes. Such foot pads are cylindrical in form with an upper annular recess for coupling within bores formed in the lower floor. The cabinet further includes parallel front and rear faces 20, 22, parallel side faces 24, 26 and a generally cylindrical top 28. The floor has at least one aperture 30 with an associated screw 32 therethrough for coupling the floor to the remainder of the cabinet to selectively attain access to the interior of the cabinet.

Also provided is a circular screen 34 formed on a lower left corner of the front face of the cabinet with a temperature sensor 36 thereadjacent within the cabinet. The temperature sensor is adapted for sensing the temperature within the room where the cabinet is located. Additionally provided are three lights 40, 42, 44 with distinctively different colors mounted in vertical alignment along a lower right corner of the front face of the cabinet. The lights are equipped with associated indicia on the front face of the cabinet to indicate a "warm" temperature, "low" temperature and "freezing" temperature.

A battery 48 is provided with associated electrical components 50 for coupling the temperature sensor and lights to indicate the temperature sensed by the temperature sensor by illuminating one of the lights at a corresponding one of three temperature levels. To accomplish this, the temperature sensor and any associated control circuitry is adapted to transmit unique signals at three discrete temperatures one of which is freezing temperature and a remaining two of which are two distinct temperatures above freezing.

Also provided is a cover plate 54 located in the rear face of the cabinet to selectively allow access to the interior of the cabinet and batteries by a user. A speaker 58 is provided within the cabinet and mounted with respect to the front face and coupled by the electrical components to the sensor and lights. The speaker is adapted for providing an audible alarm only when the freezing light is activated and illuminated. Ideally, the speaker is mounted within the cabinet adjacent to a circular grill formed in the front face of the cabinet.

Lastly provided are two laterally spaced key hole shaped slots 59 formed in the rear face of the cabinet. The slots are adapted for allowing the cabinet to be mounted to the wall of the room to be sensed.

As described hereinabove, the system of the present invention is a new type of compact, self-contained, battery-powered detector system. As with many modern smoke detectors, the present system features a plastic housing, the interior of which is fitted with a long-life lithium battery and an audible alarm. Instead of an ionization or photoelectric smoke sensor, however, it is equipped with a metal or related type of temperature sensor and its associated control circuitry. The outer housing of the unit measures 5 inches high by 4 inches wide and features a curved or hemispherical upper surface. In addition to a grille for the alarm element, the front surface of the unit is equipped with a series of three colored warning lights. The housing is configured so that it can be set up on a table or related surface or mounted on a wall.

The internal logic of this system is configured so that it is able to continuously monitor the temperature inside the area in which it is located. When the temperature drops below a preprogrammed level, the system triggers the alarm. The appealing features of this system are its small size, ease of use, and the protection it provides. This system is easily set up and automatically and continuously monitor the temperature in a specified area.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new and improved cold temperature alarm system for informing and alarming occupants of a room, audibly and visually, of the temperature condition comprising, in combination:

a cabinet having a rectangular lower floor with four rubber foot pads adjacent to the corners for support purposes and parallel front and rear faces and parallel side faces and a generally cylindrical top, the floor having at least one aperture with an associated screw therethrough for coupling the floor to the remainder of the cabinet to selectively attain access to the interior of the cabinet;

a screen formed in the front face of the cabinet with a temperature sensor thereadjacent within the cabinet for sensing the temperature within the room where the cabinet is located;

three lights with distinctively different colors and with associated indicia on the front face of the cabinet to indicate "warm" temperature, "low" temperature and "freezing" temperature;

a battery and associated electrical components coupling the temperature sensor and lights to indicate the temperature sensed by the temperature sensor;

a cover plate located in the rear face of the cabinet to selectively allow access to the interior of the cabinet by a user;

a speaker within the cabinet and mounted with respect to the front face and coupled by the electrical components to the sensor and lights for providing an audible alarm when the freezing light is activated and illuminated; and two key hole shaped slots in the rear face of the cabinet for allowing the cabinet to be mounted to the wall of the room to be sensed.

2. The cold temperature alarm system of claim 1 wherein the cabinet has a rectangular lower floor with four rubber foot pads adjacent to the corners for support purposes and parallel front and rear faces and parallel side faces and a generally cylindrical top, the floor having at least one aperture with an associated screw therethrough for coupling the floor to the remainder of the cabinet to selectively attain access to the interior of the cabinet.

3. A cold temperature alarm system for monitoring the temperature in a room comprising:

a cabinet;

a temperature sensor mounted in the cabinet;

a plurality of lights with distinctively different colors and indicia marked on a front face of the cabinet adjacent to each of the lights; and electrical circuitry coupling the temperature sensor and lights for illuminating one of the lights at discreet temperature levels sensed by the temperature sensor, one of such temperature levels being a freezing temperature level;

wherein the indicia adjacent to a first of the lights indicates a "warm" temperature level, the indicia adjacent to a second of the lights indicates a "low" temperature level, and the indicia adjacent to a third of the lights indicates the "freezing" temperature level, and wherein the electrical circuitry is adapted to activate the light corresponding to the temperature sensed by the temperature sensor;

and a speaker is connected to the temperature sensor for emitting an audible alarm only upon the detection of the temperature at the freezing point and below the freezing point by the temperature sensor;

and a screen formed on the front face of the cabinet with the temperature sensor positioned adjacent to the screen.

4. A cold temperature alarm system as set forth in claim 3 wherein three temperature levels are indicated two of which are at discrete temperatures above the freezing temperature.

5. A cold temperature alarm system as set forth in claim 3 additionally comprising a battery mounted in the housing for supplying electrical energy to the electrical circuitry.

6. The cold temperature alarm system of claim 3 wherein the plurality of lights comprises three lights, and the indicia indicates a "warm" temperature, a "low" temperature and a "freezing" temperature.

7. The cold temperature alarm system of claim 6 additionally comprising two key hole shaped slots in a rear face of the cabinet for allowing the cabinet to be mounted to the wall of the room in which the temperature is to be sensed.

8. The cold temperature alarm system of claim 3 additionally comprising a cover plate located on a rear face of the cabinet to selectively allow access to the interior of the cabinet by a user.

9. A cold temperature alarm system for providing an audible and visual alarm of a temperature condition, the alarm system comprising:

a cabinet having a lower floor and a front face and a rear face and side faces and a top;

a screen formed in one of the faces of the cabinet with a temperature sensor located in the cabinet adjacent to the screen for sensing the temperature in the room where the cabinet is located;

a plurality of lights mounted on the cabinet, each of the lights having a distinctively different color from the other of the lights, and indicia adjacent to each of the lights on the cabinet to indicate "warm" temperature, "low" temperature and "freezing" temperature;

electrical circuitry operatively coupling the temperature sensor and lights to indicate the temperature sensed by the temperature sensor;

a sound generating means for generating an audible sound, the sound generating means being mounted on the cabinet and operatively coupled to the electrical components and the sensor and lights for providing an audible alarm when the freezing light is activated and illuminated.

10. The cold temperature alarm system of claim 9 wherein the floor has at least one aperture with an associated screw therethrough for coupling the floor to the remainder of the cabinet to selectively attain access to the interior of the cabinet.

11. The cold temperature alarm system of claim 9 additionally comprising a cover plate located in the rear face of the cabinet to selectively allow access to the interior of the cabinet by a user.

12. The cold temperature alarm system of claim 9 additionally comprising two key hole shaped slots in the rear face of the cabinet for allowing the cabinet to be mounted to the wall of the room in which the temperature is to be sensed.

* * * * *